(12) United States Patent
Xie et al.

(10) Patent No.: US 11,737,127 B2
(45) Date of Patent: Aug. 22, 2023

(54) MULTI-RADIO FREQUENCY ANTI-INTERFERENCE METHOD AND RELATED DEVICE

(71) Applicant: Huawei Technologies Co., Ltd., Shenzhen (CN)

(72) Inventors: Jianping Xie, Nanjing (CN); Fang Liu, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 17/244,366

(22) Filed: Apr. 29, 2021

(65) Prior Publication Data

US 2021/0345350 A1   Nov. 4, 2021

(30) Foreign Application Priority Data

Apr. 30, 2020   (CN) .......................... 202010366428.3

(51) Int. Cl.
*H04W 72/12* (2023.01)
*H04B 1/40* (2015.01)
*H04B 1/10* (2006.01)
*H04W 72/541* (2023.01)
*H04W 72/044* (2023.01)
*H04W 72/542* (2023.01)

(52) U.S. Cl.
CPC ....... *H04W 72/541* (2023.01); *H04W 72/044* (2013.01); *H04W 72/542* (2023.01)

(58) Field of Classification Search
CPC ............. H04W 72/541; H04W 72/542; H04W 72/044
See application file for complete search history.

(56) References Cited

U.S. PATENT DOCUMENTS

| | | | | |
|---|---|---|---|---|
| 5,095,285 A * | 3/1992 | Khatibzadeh | ............ | H03H 7/38 330/306 |
| 5,812,027 A * | 9/1998 | Koifman | ............... | H03F 3/4565 330/253 |
| 5,914,990 A * | 6/1999 | Soderkvist | ............ | H04L 27/233 375/350 |
| 8,804,624 B1 * | 8/2014 | Lee | ........................ | H04B 1/406 370/328 |
| 9,692,581 B1 * | 6/2017 | Kim | ...................... | H04L 5/0073 |
| 10,211,899 B1 * | 2/2019 | Liu | ...................... | H04B 7/0617 |
| 10,356,801 B1 * | 7/2019 | Liu | ........................ | H04W 72/51 |
| 10,555,315 B1 * | 2/2020 | Mansour | ............ | H04W 72/541 |
| 2006/0268705 A1 * | 11/2006 | Kurobe | ................. | H04W 74/04 370/230 |
| 2007/0281632 A1 * | 12/2007 | Poon | ..................... | H04B 7/043 455/562.1 |

(Continued)

FOREIGN PATENT DOCUMENTS

| | | |
|---|---|---|
| CN | 106982097 A | 7/2017 |
| CN | 107171740 A | 9/2017 |

(Continued)

*Primary Examiner* — Dominic E Rego
(74) *Attorney, Agent, or Firm* — Conley Rose, P.C.

(57) ABSTRACT

A multi-radio frequency anti-interference method includes a wireless device scheduling a terminal device and a plurality of analog radio frequency circuits, to prevent coexistence of a first signal and a second signal. The first signal is a signal from the wireless device, and the second signal is a signal from the terminal device to the wireless device.

20 Claims, 8 Drawing Sheets

(56) References Cited

U.S. PATENT DOCUMENTS

| | | | |
|---|---|---|---|
| 2010/0140758 A1* | 6/2010 | Doherty | H01L 23/66 257/659 |
| 2011/0021153 A1* | 1/2011 | Safavi | H04B 17/27 455/63.1 |
| 2011/0170640 A1* | 7/2011 | Morishita | H04B 1/28 327/91 |
| 2012/0082077 A1* | 4/2012 | Zhang | H04L 5/14 370/328 |
| 2012/0098600 A1* | 4/2012 | Chehrazi | H03G 1/0088 330/278 |
| 2012/0263112 A1* | 10/2012 | Sum | H04W 16/14 370/328 |
| 2012/0269130 A1* | 10/2012 | Sum | H04W 16/14 370/328 |
| 2012/0276938 A1* | 11/2012 | Wagholikar | H04W 72/1215 455/514 |
| 2015/0109067 A1* | 4/2015 | Park | H01F 19/04 333/17.1 |
| 2015/0365960 A1* | 12/2015 | Davydov | H04W 76/20 370/252 |
| 2017/0257582 A1* | 9/2017 | Jung | H04N 25/76 |
| 2017/0325199 A1* | 11/2017 | Hirsch | H04W 72/02 |
| 2018/0242331 A1* | 8/2018 | Zhu | H04B 7/0697 |
| 2018/0317204 A1* | 11/2018 | Koue | H04W 36/30 |
| 2019/0007072 A1* | 1/2019 | Yuan | H04W 88/06 |
| 2019/0158193 A1 | 5/2019 | Jain et al. | |
| 2019/0320441 A1 | 10/2019 | Ahluwalia et al. | |
| 2020/0229107 A1* | 7/2020 | Venkatasubramanian | H04W 52/146 |
| 2021/0014873 A1* | 1/2021 | Akhtar | H04W 74/04 |
| 2021/0111855 A1* | 4/2021 | Verma | H04L 5/0075 |
| 2021/0282103 A1* | 9/2021 | Zhu | H04W 76/15 |

FOREIGN PATENT DOCUMENTS

| | | |
|---|---|---|
| CN | 107277912 A | 10/2017 |
| CN | 106256143 B | 2/2020 |
| EP | 3128776 A1 | 2/2017 |

* cited by examiner

| 401 — A wireless device schedules a terminal device and a plurality of analog radio frequency circuits corresponding to a plurality of radio frequencies, to attempt to prevent coexistence of a first signal and a second signal |

MULTI-RADIO FREQUENCY ANTI-INTERFERENCE METHOD AND RELATED DEVICE

CROSS-REFERENCE TO RELATED APPLICATION

This application claims priority to Chinese Patent Application No. 202010366428.3 filed on Apr. 30, 2020, which is hereby incorporated by reference in its entirety.

TECHNICAL FIELD

This application relates to the communications field, and in particular, to a multi-radio frequency anti-interference method and a related device.

BACKGROUND

With popularization of a wireless local area network (WLAN), and especially with a rise of the internet of things (IOT), a large quantity of IOT terminals such as a sensor, a collector, and a controller need to be deployed. In a high-density use scenario, a wireless access point also needs to support an increasing quantity of terminals.

Due to different scenarios, different industry requirements, and historical reasons, wireless data, IOT access technologies, and protocols of different standards are generated. To simplify deployment and reduce network construction costs, a multi-radio frequency integration solution based on an independent digital baseband processing circuit is developed. A principle of the solution is shown in FIG. 1. Each set of radio frequency units includes independent media access control (MAC), a digital baseband processing circuit, an analog radio frequency circuit, and an antenna system (not shown in the figure). Each radio frequency unit establishes a wireless communication relationship with a corresponding wireless communication object (such as a mobile phone terminal and a wireless IOT terminal), and controls communication processing such as data receiving and sending and signal encoding and demodulation with a communication object of the radio frequency unit.

However, when a plurality of radio frequencies randomly receive and send packets, a case in which one radio frequency sends a packet and another radio frequency receives the packet is likely to occur, causing near end interference. As shown in FIG. 2, when a first radio frequency unit 201 sends a signal, a second radio frequency unit 202 in receiving mode receives an interference signal from the first radio frequency unit 201 while receiving a local channel signal. Therefore, receiving of the second radio frequency unit 202 is affected.

SUMMARY

This application provides a multi-radio frequency anti-interference method and a related device, to reduce interference between a plurality of radio frequencies.

According to a first aspect, this application provides a multi-radio frequency anti-interference method.

The method includes a wireless device scheduling a terminal device and a plurality of analog radio frequency circuits, to attempt to prevent coexistence of a first signal and a second signal. The first signal is a signal sent by the wireless device, and the second signal is a signal sent by the terminal device to the wireless device.

In this application, the wireless device schedules the terminal device and the plurality of analog radio frequency circuits, to attempt to prevent the coexistence of the first signal and the second signal. The first signal is a signal sent by a first analog radio frequency circuit, and the second signal is a signal sent by the terminal device to a second analog radio frequency circuit. The first analog radio frequency circuit is any one of the plurality of analog radio frequency circuits, and the second analog radio frequency circuit is any one of the plurality of analog radio frequency circuits except the first analog radio frequency circuit. To be specific, the wireless device schedules the plurality of analog radio frequency circuits to attempt to send the first signal and receive the second signal in different time periods, so as to avoid, as much as possible, interference impact caused by an interference signal from the first signal on receiving of the second signal by the wireless device.

In a possible design, in a first implementation of the first aspect of this application, the plurality of analog radio frequency circuits includes the first analog radio frequency circuit and the second analog radio frequency circuit. The first analog radio frequency circuit is any one of the plurality of analog radio frequency circuits, and the second analog radio frequency circuit is any one of the plurality of analog radio frequency circuits except the first analog radio frequency circuit.

In a possible design, in a second implementation of the first aspect of this application, the wireless device schedules the analog radio frequency circuit and the terminal device in a plurality of manners. For example, the wireless device schedules the first analog radio frequency circuit to send the first signal to the terminal device in a first time period, and the wireless device schedules the terminal device not to send the second signal to the wireless device in the first time period.

In this possible design, the wireless device schedules the analog radio frequency circuit to send the first signal, and attempts not to receive the second signal, to prevent the coexistence of the first signal and the second signal, and avoid, as much as possible, the interference impact caused by the interference signal from the first signal on the receiving of the second signal by the wireless device.

In a possible design, in a third implementation of the first aspect of this application, the wireless device schedules the analog radio frequency circuit and the terminal device in a plurality of manners. For example, the wireless device schedules the second analog radio frequency circuit not to send the first signal to the terminal device in a second time period, and the wireless device schedules the terminal device to send the second signal to the wireless device in the second time period.

In this possible design, the wireless device schedules the analog radio frequency circuits to receive the second signal, and does not send the first signal, to prevent the coexistence of the first signal and the second signal, and avoid, as much as possible, the interference impact caused by the interference signal from the first signal on the receiving of the second signal by the wireless device.

In a possible design, in a fourth implementation of the first aspect of this application, the first analog radio frequency circuit and the second analog radio frequency circuit each meet a requirement of a different standard, and the first analog radio frequency circuit and the second analog radio frequency circuit can replace each other.

In this possible design, the first analog radio frequency circuit and the second analog radio frequency circuit can meet requirements of different standards. Therefore, the first analog radio frequency circuit and the second analog radio frequency circuit can be flexibly combined and configured.

In a possible design, in a fifth implementation of the first aspect of this application, the method further includes the first analog radio frequency circuit in the wireless device sending a first target signal in a third time period, the wireless device transforming the first target signal into a cancellation signal of the first target signal based on an interference cancellation model, where the interference cancellation model is related to interference caused by the first analog radio frequency circuit to the second analog radio frequency circuit, and the wireless device cancelling a first interference signal in a second target signal based on the cancellation signal, where the second target signal is a signal received by the second analog radio frequency circuit in the third time period, and the first interference signal is interference caused by the first analog radio frequency circuit in the third time period to the second analog radio frequency circuit.

In this possible design, the interference signal is cancelled by using the interference cancellation model, to avoid, as much as possible, the interference impact caused by the interference signal from the first signal on the receiving of the second signal by the wireless device.

In a possible design, in a sixth implementation of the first aspect of this application, the method further includes the first analog radio frequency circuit in the wireless device sending a training signal in a training time period, the second analog radio frequency circuit in the wireless device receiving a second interference signal in the training time period, where the second interference signal is interference caused by the first analog radio frequency circuit in the training time period to the second analog radio frequency circuit, and the wireless device obtaining the interference cancellation model by training the training signal and the second interference signal.

In this possible design, an implementation of pre-training the training signal and the second interference signal to obtain the interference cancellation model is provided.

In a possible design, in a seventh implementation of the first aspect of this application, operating bands of a plurality of radio frequencies are the same or similar.

In a possible design, in an eighth implementation of the first aspect of this application, the method further includes the wireless device creating, according to standards of the plurality of radio frequencies, digital baseband processing entities corresponding to the plurality of radio frequencies, and the wireless device processing the first signal and/or the second signal by using the digital baseband processing entities.

In this possible design, a digital baseband processing circuit that can be customized by using software is used to meet a requirement that one set of hardware supports flexible combination and deployment of a plurality of radio frequency standards.

According to a second aspect, this application provides a wireless device, including a scheduling unit, configured to schedule a terminal device and a plurality of analog radio frequency circuits corresponding to a plurality of radio frequencies, to attempt to prevent coexistence of a first signal and a second signal. The first signal is a signal sent by a first analog radio frequency circuit, and the second signal is a signal sent by the terminal device to a second analog radio frequency circuit.

In a possible design, in a first implementation of the second aspect of this application, the plurality of analog radio frequency circuits includes the first analog radio frequency circuit and the second analog radio frequency circuit. The first analog radio frequency circuit is any one of the plurality of analog radio frequency circuits, and the second analog radio frequency circuit is any one of the plurality of analog radio frequency circuits except the first analog radio frequency circuit.

In a possible design, in a second implementation of the second aspect of this application, the scheduling unit is specifically configured to schedule the first analog radio frequency circuit to send the first signal to the terminal device in a first time period, and the scheduling unit is specifically configured to schedule the terminal device not to send the second signal to the wireless device in the first time period.

In a possible design, in a third implementation of the second aspect of this application, the scheduling unit is specifically configured to schedule the second analog radio frequency circuit not to send the first signal to the terminal device in a second time period, and the scheduling unit is specifically configured to schedule the terminal device to send the second signal to the wireless device in the second time period.

In a possible design, in a fourth implementation of the second aspect of this application, the first analog radio frequency circuit and the second analog radio frequency circuit each meet a requirement of a different standard, and the first analog radio frequency circuit and the second analog radio frequency circuit can replace each other.

In a possible design, in a fifth implementation of the second aspect of this application, the wireless device further includes a sending unit, configured to send a first target signal in a third time period, a transformation unit, configured to transform the first target signal into a cancellation signal of the first target signal based on an interference cancellation model, where the interference cancellation model is related to interference caused by the first analog radio frequency circuit to the second analog radio frequency circuit, and a cancellation unit, configured to cancel a first interference signal in a second target signal based on the cancellation signal, where the second target signal is a signal received by the second analog radio frequency circuit in the third time period, and the first interference signal is interference caused by the first analog radio frequency circuit in the third time period to the second analog radio frequency circuit.

In a possible design, in a sixth implementation of the second aspect of this application, the sending unit is further configured to send a training signal in a training time period.

The wireless device further includes a receiving unit, configured to receive a second interference signal in the training time period, where the second interference signal is interference caused by the first analog radio frequency circuit in the training time period to the second analog radio frequency circuit, and a training unit, configured to obtain the interference cancellation model by training the training signal and the second interference signal.

In a possible design, in a seventh implementation of the second aspect of this application, operating bands of the plurality of radio frequencies are the same or similar.

In a possible design, in an eighth implementation of the second aspect of this application, the wireless device further includes a creation unit, configured to create, according to standards of the plurality of radio frequencies, digital baseband processing entities corresponding to the plurality of radio frequencies, and a processing unit, configured to process the first signal and/or the second signal by using the digital baseband processing entities.

According to a third aspect, this application provides a wireless device. The wireless device includes a processor and a memory. The processor is coupled to the memory. The memory is configured to store instructions for performing the method in the first aspect and the implementations of the first aspect, and store data used to implement the method in the first aspect and the implementations of the first aspect. The processor is configured to execute the instructions stored in the memory, so that the wireless device implements the method according to any one of the first aspect or the implementations of the first aspect in this application. In a possible design, the wireless device is a chip or a system on chip.

The processor mentioned above may be a general-purpose central processing unit (CPU), a microprocessor, an application-specific integrated circuit (ASIC), or one or more integrated circuits for controlling program execution of the multi-radio frequency anti-interference method in the first aspect.

According to a fourth aspect, this application provides a chip, applied to a wireless device. The wireless device includes the chip and a plurality of analog radio frequency circuits. The chip is configured to schedule a terminal device and the plurality of analog radio frequency circuits, to attempt to prevent coexistence of a first signal and a second signal. The first signal is a signal sent by a first analog radio frequency circuit, and the second signal is a signal sent by the terminal device to a second analog radio frequency circuit. The first analog radio frequency circuit is any one of the plurality of analog radio frequency circuits, and the second analog radio frequency circuit is any one of the plurality of analog radio frequency circuits except the first analog radio frequency circuit.

In a possible design, in a first implementation of the fourth aspect of this application, the chip includes a digital baseband processing circuit and the plurality of analog radio frequency circuits, and the digital baseband processing circuit is configured to generate the first signal.

According to a fifth aspect, this application provides a computer storage medium. The computer storage medium stores instructions, and when the instructions are executed on a computer, the computer is enabled to perform the method in the first aspect and the implementations of the first aspect.

According to a sixth aspect, this application provides a computer program product. When the computer program product is executed on a computer, the computer is enabled to perform the method in the first aspect and the implementations of the first aspect.

For technical effects brought by the third aspect, the fourth aspect, the fifth aspect, the sixth aspect, or any one of the implementations of these aspects, refer to technical effects brought by the first aspect or any one of the implementations of the first aspect. Details are not described herein again.

DESCRIPTION OF EMBODIMENTS

Embodiments of this application provide a multi-radio frequency anti-interference method and a related device, applied to a wireless device. In this method, the wireless device may be scheduled to send a first signal and receive a second signal in different time periods as much as possible, to avoid, as much as possible, interference impact caused by interference signal from the first signal on receiving of the second signal by the wireless device.

The following describes the technical solutions in this application in detail with reference to the accompanying drawings.

Figure 1:
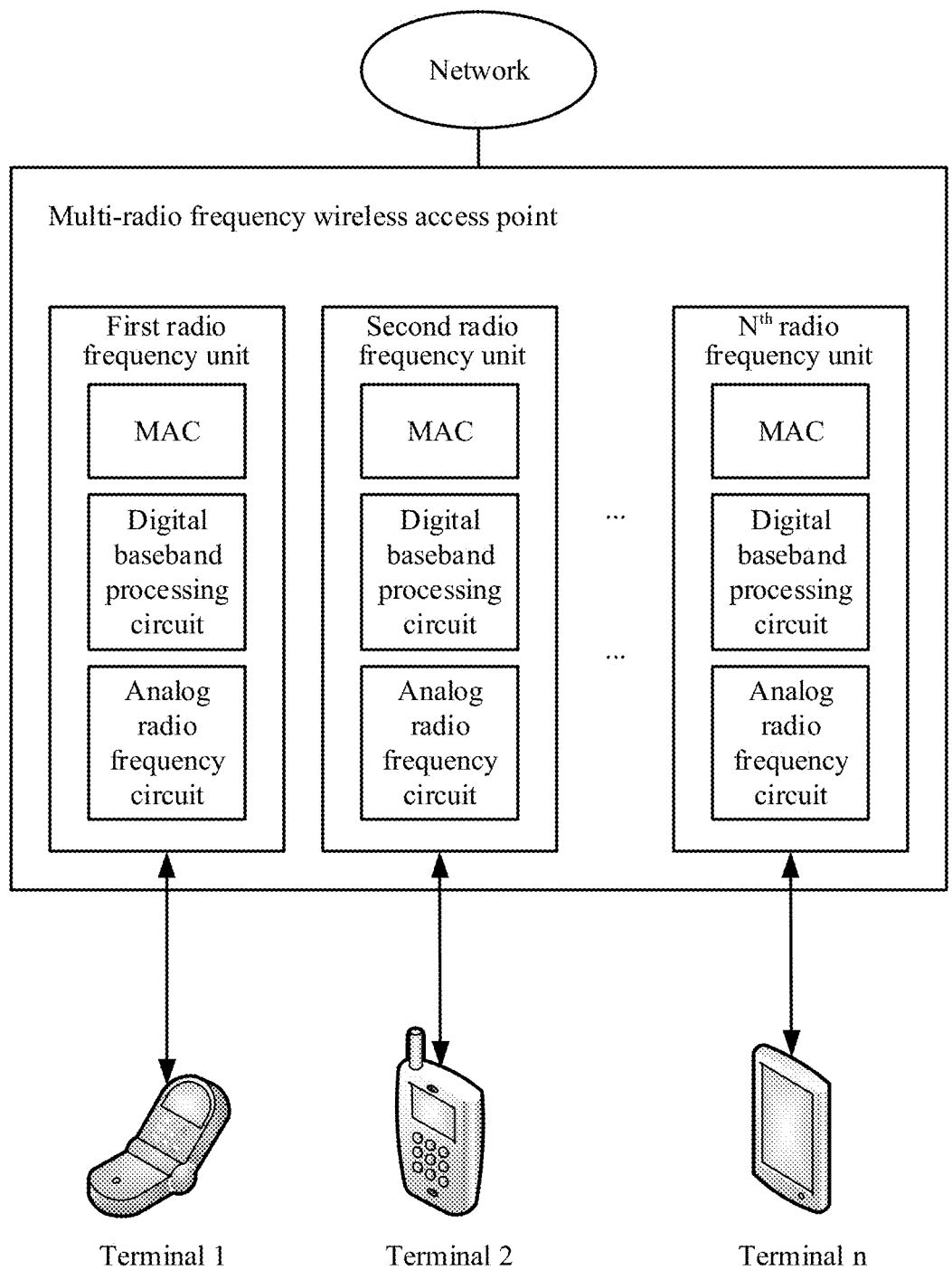
FIG. 1 is a schematic diagram of a multi-radio frequency wireless access point in the other approaches.
Figure 2:
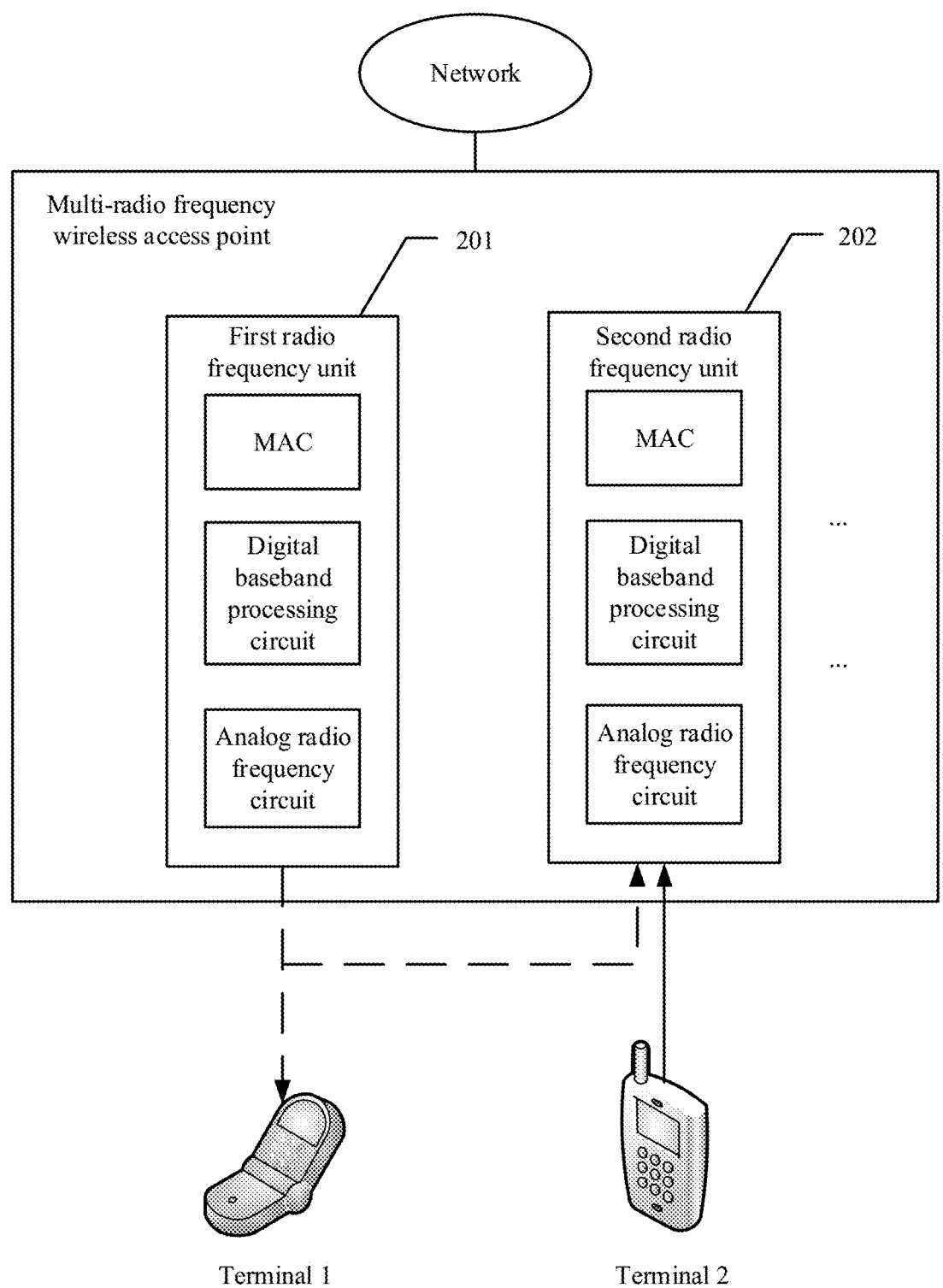
FIG. 2 is a schematic flowchart of a multi-radio frequency anti-interference method according to an embodiment of this application.
Figures 3, 4:
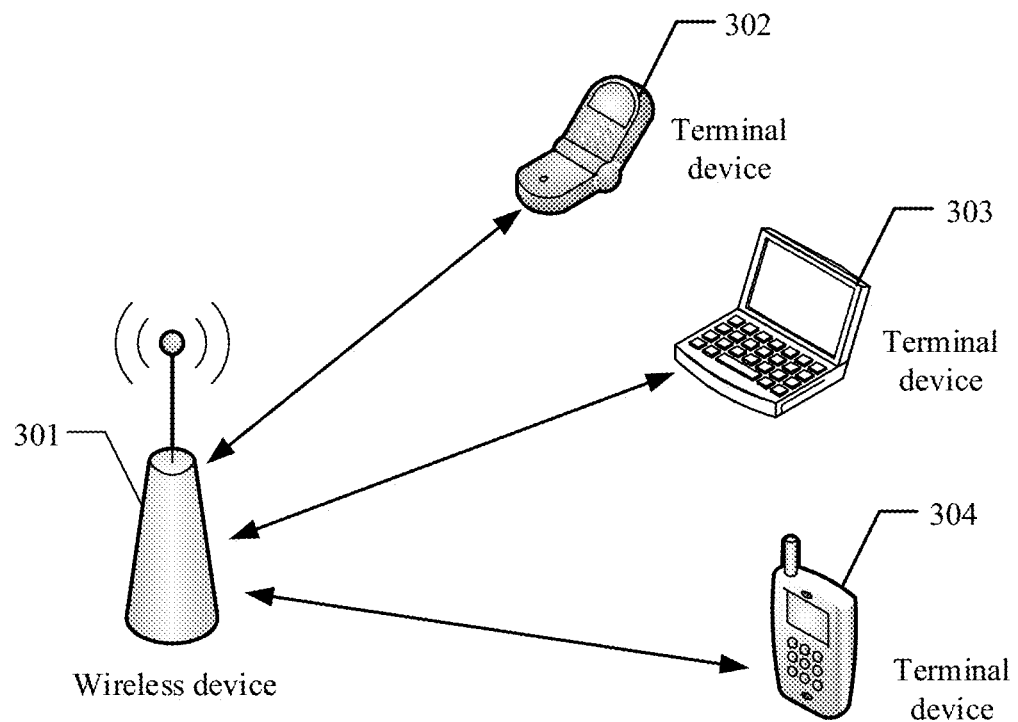
FIG. 3 is a schematic diagram of a communications system according to an embodiment of this application.
FIG. 4 is another schematic flowchart of a multi-radio frequency anti-interference method according to an embodiment of this application.

FIG. 3 is a schematic diagram of a communications system. The communications system may include a wireless device 301 and terminal devices 302 to 304 connected to the wireless device 301.

In the embodiments of this application, only one wireless device 301 and three terminal devices 302 to 304 are used as an example for description. In actual application, there may be more or fewer terminal devices in the communications system in the embodiments of this application. A quantity of terminal devices is not limited in the embodiments of this application.

All or some of the terminal devices connected to the wireless device 301 may be scheduled by the wireless device 301. This is not specifically limited herein.

The terminal devices 302 to 304 may be terminal devices of a same standard, or may be terminal devices of different standards.

A protocol standard in the embodiments of this application may be WLAN, Bluetooth, Zigbee, radio frequency identification (RFID), or the like. This is not specifically limited herein.

In the embodiments of this application, the wireless device 301 may be any device having a wireless transceiver function, including but is not limited to a base station (for example, a base station in a 5th generation communications system or a base station in a future communications system), a remote radio unit (RRU), a wireless access point, a wireless router, a wireless backhaul node, a transmission reference point (TRP), a wireless controller in a cloud radio access network (CRAN) scenario, and the like. This is not specifically limited herein.

The terminal device in the embodiments of this application may be a device that provides a user with voice and/or data connectivity, a handheld device with a wireless connection function, or another processing device connected to a wireless modem. The terminal device may be a mobile terminal, for example, a mobile phone (or referred to as a "cellular" phone), and a computer that has a mobile terminal. For example, the terminal device may be a portable, pocket-size, handheld, computer built-in, or in-vehicle mobile apparatus. These mobile apparatuses exchange voice and/or data with a wireless device. For example, the terminal device is a device such as a personal communication service (PCS) phone, a cordless phone, a Session Initiation Protocol (SIP) phone, a wireless local loop (WLL) station, or a personal digital assistant (PDA). The terminal device may also be referred to as a system, a subscriber unit, a subscriber station, a mobile station, a mobile, a remote station, an access point, a remote terminal, an access terminal, a user terminal, a user agent, a user device, or user equipment. In addition, the terminal device may alternatively be a chip system configured to implement a function of user equipment. In the embodiments of this application, only an example in which the terminal device is user equipment is used for description.

With reference to the communications system in FIG. 3, the following describes a multi-radio frequency anti-interference method in the embodiments of this application.

Referring to FIG. 4, an embodiment of the multi-radio frequency anti-interference method in the embodiments of this application includes the following step.

401. A wireless device schedules a terminal device and a plurality of analog radio frequency circuits corresponding to a plurality of radio frequencies, to attempt to prevent coexistence of a first signal and a second signal.

The analog radio frequency circuits in this embodiment of this application may be separated circuits, or may be integrated circuits. This is not specifically limited herein.

In this embodiment of this application, there may be a plurality of terminal devices, and there may be a plurality of analog radio frequency circuits. For ease of description, an example in which there are two terminal devices (a first terminal device and a second terminal device) and two analog radio frequency circuits (a first analog radio frequency circuit and a second analog radio frequency circuit) is used below for illustrative description. The first analog radio frequency circuit is any one of the plurality of analog radio frequency circuits, and the second analog radio frequency circuit is any one of the plurality of analog radio frequency circuits except the first analog radio frequency circuit.

In this embodiment of this application, the first signal is a signal sent by the wireless device to the terminal device, and the second signal is a signal sent by the terminal device to the wireless device.

There may be a plurality of cases in which the wireless device attempts to prevent the coexistence of the first signal and the second signal. The following separately describes the cases.

In a first case, the first signal and the second signal do not coexist.

To be specific, when a first radio frequency in the wireless device receives the second signal, a length of a packet queue to be sent by a second radio frequency is within a preset threshold. Alternatively, when a first radio frequency in the wireless device sends the first signal, a length of a packet queue to be received by a second radio frequency is within a preset threshold.

Figure 5:
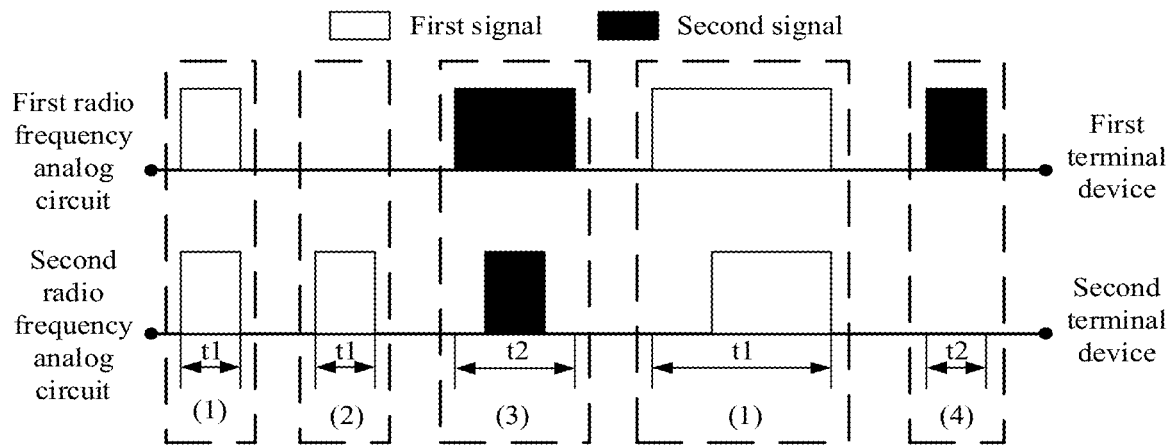
FIG. 5 is a schematic diagram of scheduling of a wireless device according to an embodiment of this application.

As shown in FIG. 5, there are a plurality of specific scheduling cases. The following uses examples for illustration.

1. The wireless device schedules the first analog radio frequency circuit to send the first signal to the first terminal device in a first time period, and schedules the second terminal device not to send the second signal to the second analog radio frequency circuit in the first time period.

(1) The wireless device schedules the first analog radio frequency circuit to send the first signal in a first time period t1, the second analog radio frequency circuit to send the first signal in the first time period t1, and the first terminal device and the second terminal device not to send the second signal to the wireless device in the first time period t1 (that is, the first analog radio frequency circuit and the second analog radio frequency circuit do not receive a signal in the first time period t1).

(2) The wireless device schedules the first analog radio frequency circuit not to send the first signal in the first time period t1, the second analog radio frequency circuit to send the first signal in the first time period t1, and the first terminal device and the second terminal device not to send the second signal to the wireless device in the first time period t1.

2. The second analog radio frequency circuit does not send the first signal in a second time period, and the second terminal device sends the second signal to the wireless device in the second time period.

(3) The wireless device schedules the first analog radio frequency circuit and the second analog radio frequency circuit not to send the first signal in a second time period t2, the first terminal device to send the second signal to the first analog radio frequency circuit in the second time period t2, and the second terminal device to send the second signal to the second analog radio frequency circuit in the second time period t2.

(4) The wireless device schedules the first analog radio frequency circuit and the second analog radio frequency circuit not to send the first signal in the second time period t2, the first terminal device to send the second signal to the first analog radio frequency circuit in the second time period t2, and the second terminal device not to send the second signal to the second analog radio frequency circuit in the second time period t2.

In this embodiment of this application, in addition to the foregoing four examples, there is another manner in which the wireless device schedules the plurality of analog radio frequency circuits and the plurality of terminal devices to attempt to prevent coexistence of the first signal and the second signal in a same time period (for example, when the wireless device schedules the first analog radio frequency circuit to send the first signal to the first terminal device, another analog radio frequency circuit is shielded from receiving the second signal, or when the wireless device schedules the first analog radio frequency circuit to send the first signal to the first terminal device, an indication signal is sent to another terminal device other than the first terminal device, and the indication signal is used to indicate the another terminal device not to send the second signal to the wireless device). This is not specifically limited herein. Certainly, in addition to the foregoing scheduling manners, the wireless device may alternatively schedule all of the plurality of analog radio frequency circuits to send the first signal or receive the second signal in a same time period.

In a second case, the first signal and the second signal coexist.

There are a plurality of cases in which the first signal and the second signal coexist. The following uses examples for illustration.

1. When the first radio frequency in the wireless device receives the second signal, a packet queue to be sent by the second radio frequency exceeds a preset threshold.

2. When the first radio frequency in the wireless device sends the first signal, a packet queue to be received by the second radio frequency exceeds a preset threshold.

3. There is a target terminal device that is not scheduled by the wireless device (the terminal device that is not scheduled by the wireless device actively sends a packet to the wireless device).

In this embodiment of this application, there may be many manners in which the first signal and the second signal coexist. The foregoing three manners are examples in which the first signal and the second signal coexist. This is not specifically limited herein.

When the first signal and the second signal coexist, in the embodiments of this application, an interference signal is cancelled by using an interference cancellation model, to reduce interference. Specific operations may be as follows.

Figure 6:
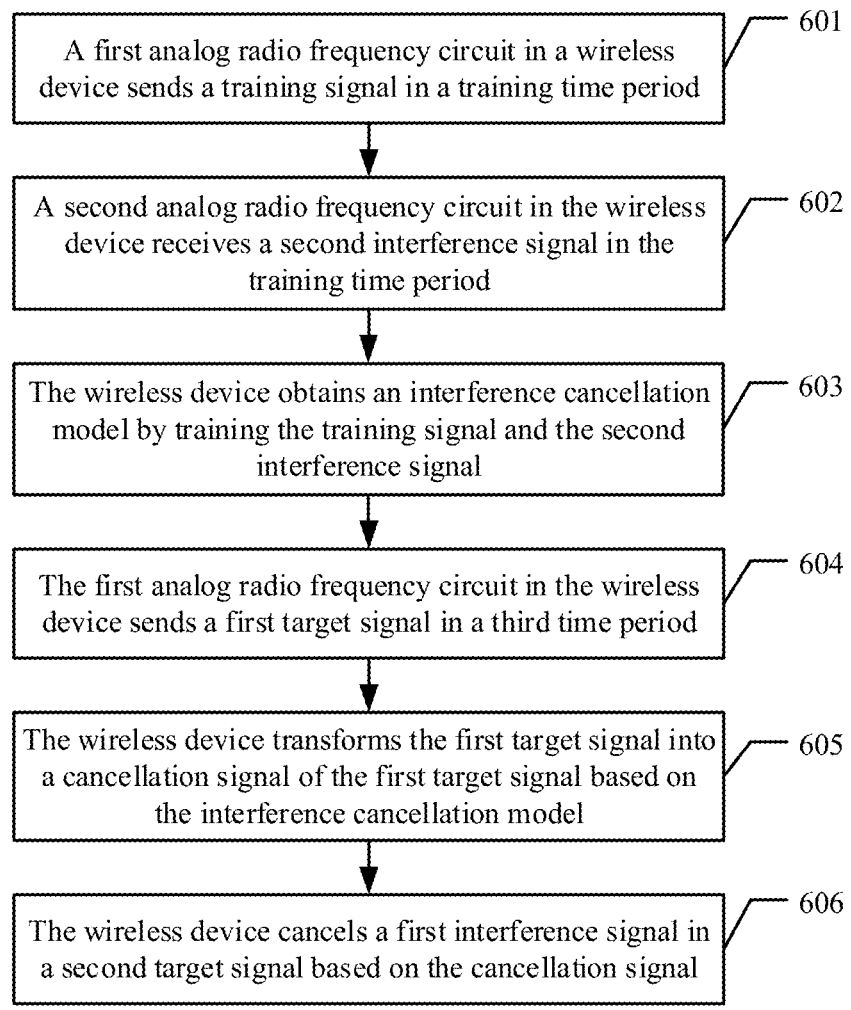
FIG. 6 is a schematic flowchart of canceling signal interference according to an embodiment of this application.

As shown in FIG. 6, when a wireless device cannot schedule a packet that is being processed and/or a terminal device that is not scheduled by the wireless device actively sends a packet to the wireless device, after a working standard of a first radio frequency is determined, the wireless device may start an interference training process. Specific operations are as follows.

601. A first analog radio frequency circuit in the wireless device sends a training signal in a training time period.

Figure 7:
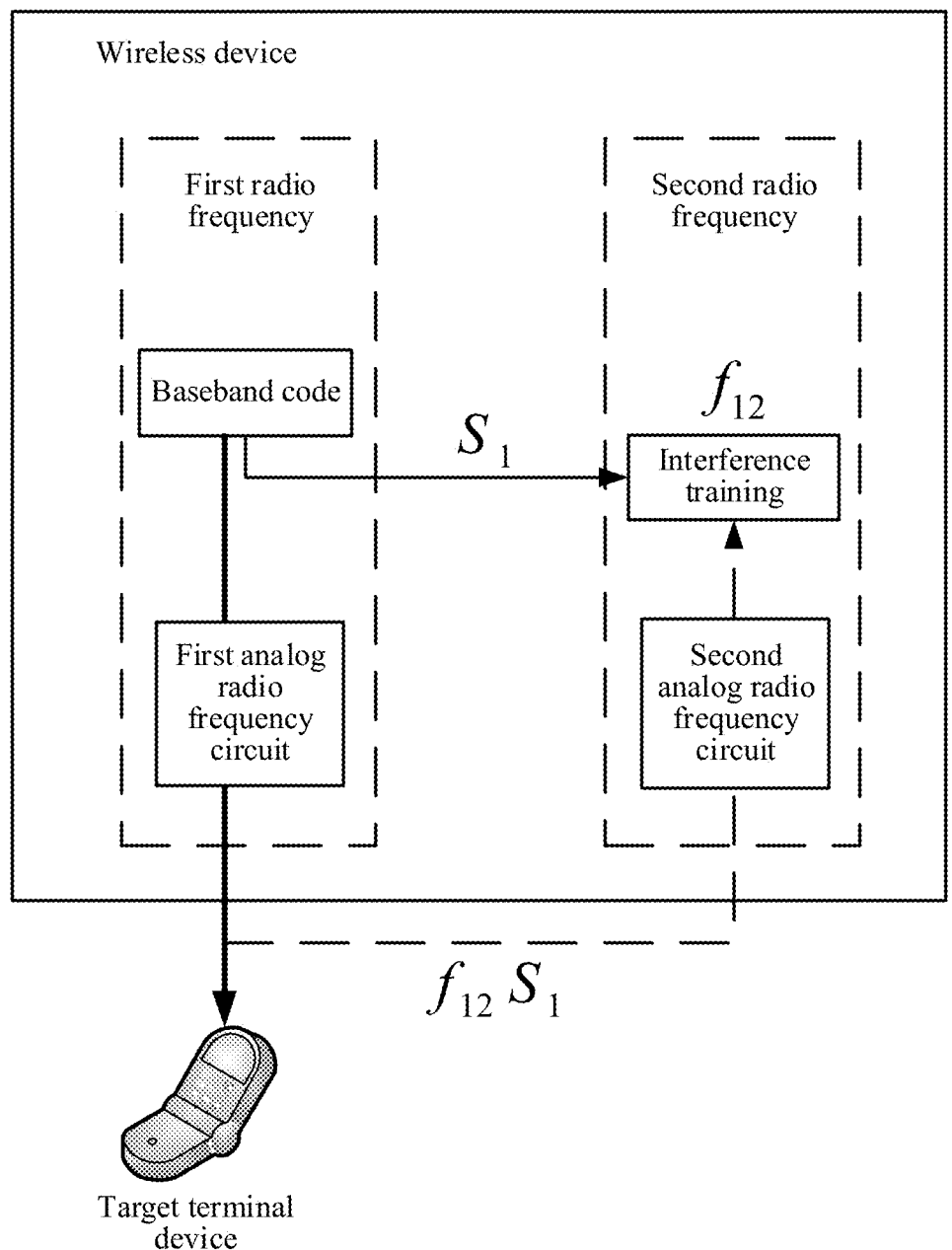
FIG. 7 is a schematic diagram of building a training model according to an embodiment of this application.

As shown in FIG. 7, in the training time period, a digital baseband processing circuit of the first radio frequency generates a group of training signals by using a specified coding sequence $S_1$, sends the training signals to a target terminal device by using the first analog radio frequency circuit, and sends the specified coding sequence $S_1$ to a second radio frequency.

602. A second analog radio frequency circuit in the wireless device receives a second interference signal in the training time period.

In the training time period, the second radio frequency is in receiving mode, and receives the second interference signal from the training signal.

603. The wireless device obtains the interference cancellation model by training the training signal and the second interference signal.

The second radio frequency obtains the interference cancellation model by using the received second interference signal and the known specified coding sequence $S_1$ (or the training signal). For example, an interference function F of an interference model is obtained, and $F=f_{12}S_1$.

604. The first analog radio frequency circuit in the wireless device sends a first target signal in a third time period.

Figure 8:
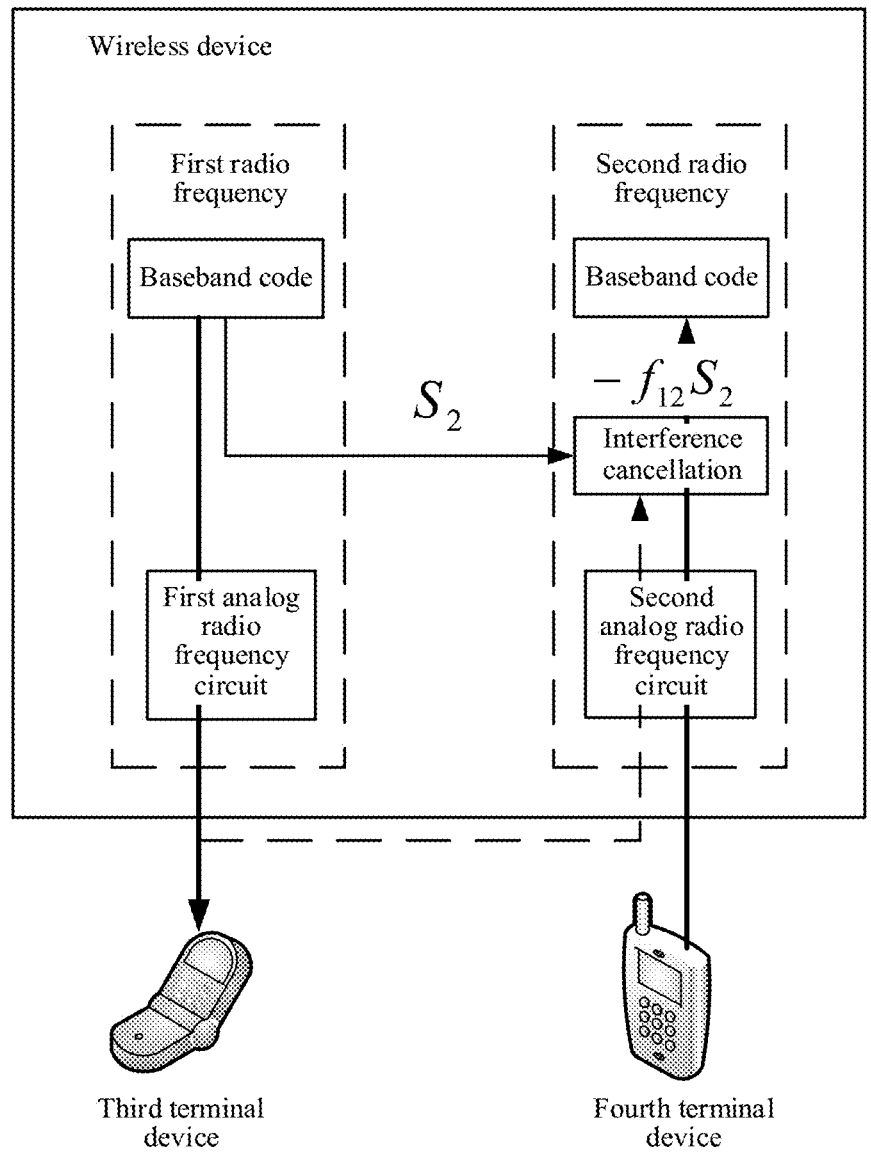
FIG. 8 is a schematic diagram of an interference cancellation scenario according to an embodiment of this application.

As shown in FIG. 8, the first analog radio frequency circuit sends the first target signal to a third terminal device in the third time period, and sends a specified coding sequence $S_2$ of the first target signal to the second analog radio frequency circuit.

605. The wireless device transforms the first target signal into a cancellation signal of the first target signal based on the interference cancellation model.

The second analog radio frequency circuit transforms the first target signal into the cancellation signal of the first target signal based on $S_2$ and the interference cancellation model.

606. The wireless device cancels a first interference signal in a second target signal based on the cancellation signal.

A fourth terminal device sends the second target signal to the second radio frequency in the third time period. Because the first radio frequency sends the first target signal to the third terminal device in the third time period, the second analog radio frequency circuit may further receive, in the third time period, the first interference signal brought by the first analog radio frequency circuit to the second analog radio frequency circuit. After the second analog radio frequency circuit receives the second target signal, the cancellation signal cancels the first interference signal out, to filter out interference caused by the first analog radio frequency circuit to the second analog radio frequency circuit in the third time period.

In this embodiment of this application, when a radio frequency feature (one or more of the work standard, a channel, an operating frequency bandwidth, and a quantity of radio frequency channels) of the first radio frequency changes, steps 601 to 603 may be repeated to refresh the training interference model. When the wireless device has a relatively large quantity of radio frequencies, every two of the radio frequencies may be combined to complete a training process in steps 601 to 603, to obtain a corresponding training model.

In this embodiment of this application, the wireless device schedules a terminal device and a plurality of analog radio frequency circuits, to attempt to prevent coexistence of the first signal and the second signal. The first signal is a signal sent by the first analog radio frequency circuit, and the second signal is a signal sent by the terminal device to the second analog radio frequency circuit. The first analog radio frequency circuit is any one of the plurality of analog radio frequency circuits, and the second analog radio frequency circuit is any one of the plurality of the analog radio frequency circuits except the first analog radio frequency circuit. To be specific, the wireless device schedules the plurality of analog radio frequency circuits to attempt to send the first signal and receive the second signal in different time periods, so as to avoid, as much as possible, interference impact caused by an interference signal from the first signal on receiving of the second signal by the wireless device. When a quantity of packets processed by the wireless device exceeds a preset threshold and/or there is a target terminal device that is not scheduled by the wireless device, the training model is used to cancel interference caused by the first target signal sent by the first analog radio frequency circuit to receiving of the second target signal by the second analog radio frequency circuit.

In the embodiments of this application, when there are packets to be sent in queues of a plurality of radio frequencies, these radio frequencies should be scheduled to simultaneously preempt a channel, and air interface transmission times occupied by the radio frequencies to send the packets should be approximately the same as much as possible. For example, if there are a plurality of short packets to be sent in a buffer, the short packets can be aggregated to a proper length and sent together. For a radio frequency with a low transmission rate, a relatively short packet is selected or constructed. For a radio frequency with a high transmission rate, a relatively long packet is constructed. In this way, simultaneous sending by the two radio frequencies is ensured in a same time period.

An application scenario of the embodiments of this application may be as follows.

1. For example, when a terminal device communicating with the first radio frequency is sending the first signal, a small quantity of packets in the second signal enter a queue of the second radio frequency, but a data volume and a packet waiting delay of the packets are within preset thresholds. A scheduler selects to schedule the second radio frequency not to send the second signal temporarily, to avoid a conflict with the first signal.

2. For example, when the terminal device communicating with the first radio frequency is sending the first signal, a packet of the second signal newly enters the queue of the second radio frequency, but a data volume or a packet waiting delay of the packet exceeds a preset threshold. The scheduler selects to schedule the second radio frequency to send a specific quantity of packets of the second signal when the first radio frequency receives the first signal. In this case, receive-side interference cancellation needs to be performed on the first radio frequency, to improve a signal-to-noise ratio of a received signal.

3. For example, when the terminal device communicating with the first radio frequency is sending the first signal, the second radio frequency has no second signal to be sent. In this case, the scheduler schedules the first radio frequency to send the first signal. If a terminal device communicating with the second radio frequency actively sends the second signal in the time period, interference cancellation needs to be started on a second radio frequency receive side, to improve a signal-to-noise ratio of a received signal.

The foregoing application scenarios of the multi-radio frequency anti-interference method in the embodiments of this application are illustrative examples of this description. This is not specifically limited herein.

Figure 9:
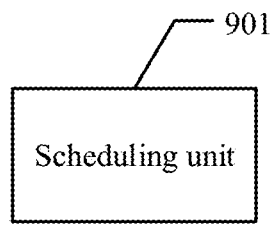
FIG. 9 is a schematic structural diagram of a wireless device according to an embodiment of this application.

The foregoing describes the multi-radio frequency anti-interference method in the embodiments of this application, and the following describes a wireless device in the embodiments of this application. Referring to FIG. 9, an embodiment of the wireless device in the embodiments of this application includes a scheduling unit 901, configured to schedule a terminal device and a plurality of analog radio frequency circuits, to attempt to prevent coexistence of a first signal and a second signal. The first signal is a signal sent by the wireless device, and the second signal is a signal sent by the terminal device to the wireless device.

In this embodiment, operations performed by the unit of the wireless device are similar to those described in the embodiments shown in FIG. 4 to FIG. 8. Details are not described herein again.

In this embodiment, the scheduling unit 901 schedules the terminal device and the plurality of analog radio frequency circuits, to attempt to prevent the coexistence of the first signal and the second signal. The first signal is a signal sent by a first analog radio frequency circuit, and the second signal is a signal sent by the terminal device to a second analog radio frequency circuit. The first analog radio frequency circuit is any one of the plurality of analog radio frequency circuits, and the second analog radio frequency circuit is any one of the plurality of the analog radio frequency circuits except the first analog radio frequency circuit. To be specific, the wireless device schedules the plurality of analog radio frequency circuits to attempt to send the first signal and receive the second signal in different time periods, so as to avoid, as much as possible, interference impact caused by an interference signal from the first signal on receiving of the second signal by the wireless device.

Figure 10:
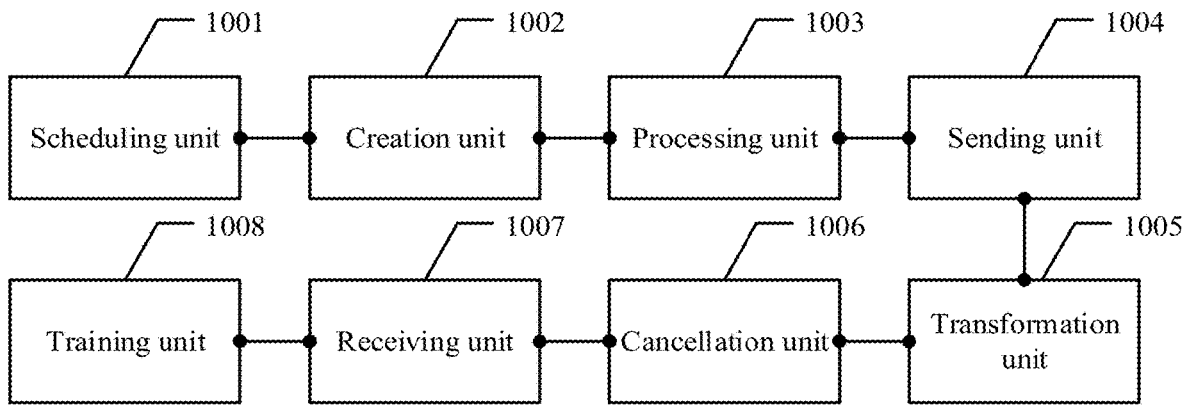
FIG. 10 is another schematic structural diagram of a wireless device according to an embodiment of this application.

Referring to FIG. 10, another embodiment of the wireless device in the embodiments of this application includes a scheduling unit 1001, configured to schedule a terminal device and a plurality of analog radio frequency circuits, to attempt to prevent coexistence of a first signal and a second signal. The first signal is a signal sent by the wireless device, and the second signal is a signal sent by the terminal device to the wireless device.

In a possible design, the plurality of analog radio frequency circuits includes a first analog radio frequency circuit and a second analog radio frequency circuit, the first analog radio frequency circuit is any one of the plurality of analog radio frequency circuits, and the second analog radio frequency circuit is any one of the plurality of analog radio frequency circuits except the first analog radio frequency circuit.

In a possible design, the scheduling unit 1001 is specifically configured to schedule the first analog radio frequency circuit to send the first signal to the terminal device in a first time period.

The scheduling unit 1001 is specifically configured to schedule the terminal device not to send the second signal to the wireless device in the first time period.

In a possible design, the scheduling unit 1001 is specifically configured to schedule the second analog radio frequency circuit not to send the first signal to the terminal device in a second time period.

The scheduling unit 1001 is specifically configured to schedule the terminal device to send the second signal to the wireless device in the second time period.

In a possible design, operating bands of a plurality of radio frequencies are the same or similar. For example, operating bands may be in a same frequency range, or in an adjacent frequency range.

In a possible design, the first analog radio frequency circuit and the second analog radio frequency circuit each meet a requirement of a different standard, and the first analog radio frequency circuit and the second analog radio frequency circuit can replace each other.

In a possible design, the wireless device further includes a creation unit 1002, configured to create, according to standards of the plurality of radio frequencies, digital baseband processing entities corresponding to the plurality of radio frequencies, and a processing unit 1003, configured to process the first signal and/or the second signal by using the digital baseband processing entities.

In a possible design, the wireless device further includes a sending unit 1004, configured to send a first target signal in a third time period, a transformation unit 1005, configured to transform the first target signal into a cancellation signal of the first target signal based on an interference cancellation model, where the interference cancellation model is related to interference caused by the first analog radio frequency circuit to the second analog radio frequency circuit, and a cancellation unit 1006, configured to cancel a first interference signal in a second target signal based on the cancellation signal, where the second target signal is a signal received by the second analog radio frequency circuit in the third time period, and the first interference signal is interference caused by the first analog radio frequency circuit to the second analog radio frequency circuit in the third time period.

The sending unit 1004 is further configured to send a training signal in a training time period.

In a possible design, the wireless device further includes a receiving unit 1007, configured to receive a second interference signal in the training time period, where the second interference signal is interference caused by the first analog radio frequency circuit in the training time period to the second analog radio frequency circuit, and a training unit

1008, configured to obtain the interference cancellation model by training the training signal and the second interference signal.

In this embodiment, operations performed by the units of the wireless device are similar to those described in the embodiments shown in FIG. 4 to FIG. 8. Details are not described herein again.

In this embodiment, the scheduling unit 1001 schedules the terminal device and the plurality of analog radio frequency circuits, to attempt to prevent the coexistence of the first signal and the second signal. To be specific, the scheduling unit 1001 schedules the plurality of analog radio frequency circuits to attempt to send the first signal and receive the second signal in different time periods, so as to avoid, as much as possible, interference impact caused by an interference signal from the first signal on receiving of the second signal by the wireless device. When the first signal and the second signal cannot be prevented from coexisting, the training unit 1008 is used to train the training signal and the second interference signal, to obtain the interference cancellation model. The cancellation unit 1006 cancels the first interference signal in the second target signal based on the cancellation signal. The interference impact caused by the interference signal from the first signal on the receiving of the second signal by the wireless device is avoided.

Figure 11:
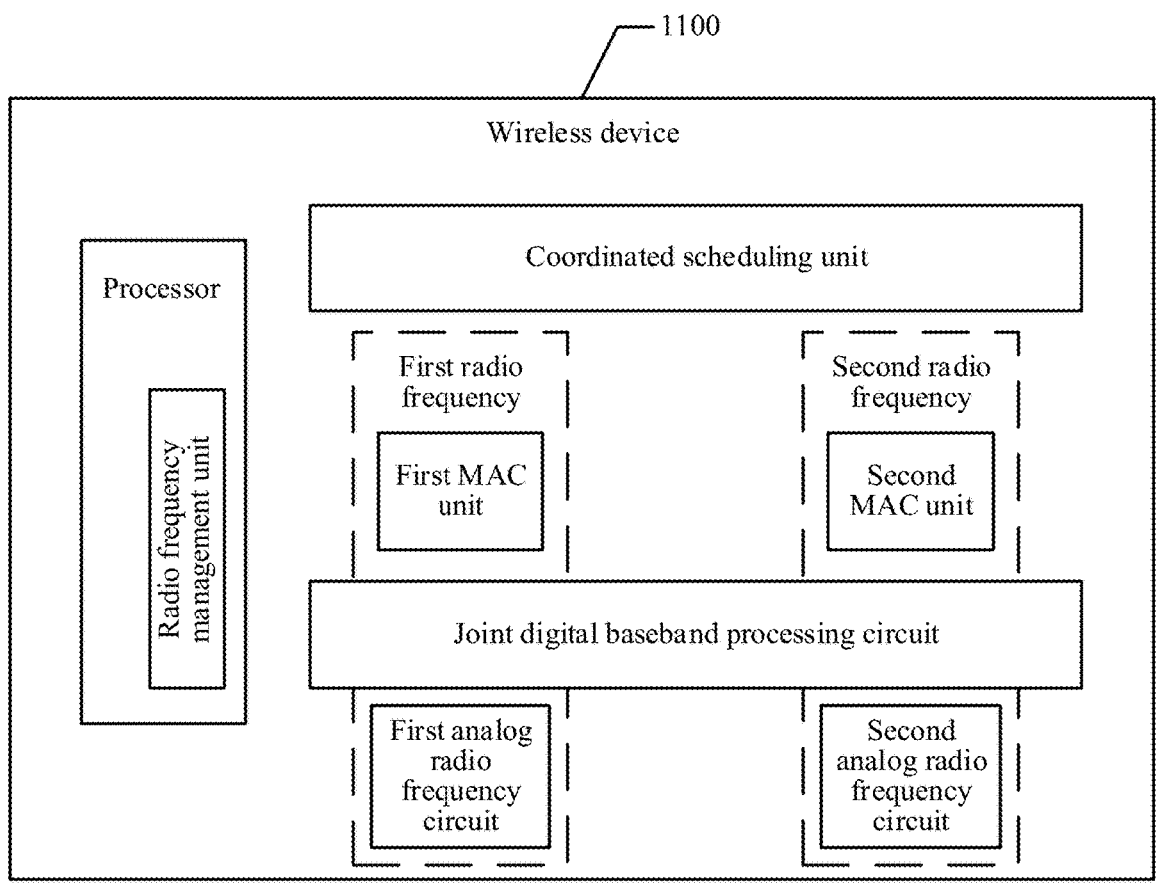
FIG. 11 is another schematic structural diagram of a wireless device according to an embodiment of this application.

FIG. 11 is another schematic structural diagram of a wireless device according to an embodiment of this application.

In this embodiment of this application, an example in which a wireless device 1100 includes two radio frequencies is one example used for description, and a quantity of radio frequencies is not limited.

The wireless device 1100 includes a first radio frequency, a second radio frequency, a first MAC unit, a second MAC unit, a first analog radio frequency circuit, a second analog radio frequency circuit, a processor, a coordinated scheduling unit, and a joint digital baseband processing circuit. The first radio frequency and the second radio frequency share one joint digital baseband processing circuit and one group of analog radio frequency circuits.

The processor includes a radio frequency management unit. Main functions of the radio frequency management unit are to determine protocol standards of the first radio frequency and the second radio frequency, create a corresponding digital baseband processing entity in a joint digital baseband processing circuit, formulate a digital signal encoding and decoding algorithm procedure by loading firmware/software, reserve a digital signal computing resource, process a cache resource, allocate a radio channel to the first radio frequency and the second radio frequency, and the like.

Main functions of the coordinated scheduling unit are to be responsible for air interface service scheduling of the first radio frequency and the second radio frequency, and reduce interference between the first radio frequency and the second radio frequency through joint scheduling and cooperation with the joint digital baseband processing circuit.

The coordinated scheduling unit may be specifically configured to schedule a terminal device and a plurality of analog radio frequency circuits, to attempt to prevent coexistence of a first signal and a second signal. The first signal is a signal sent by the wireless device, and the second signal is a signal sent by the terminal device to the wireless device. The first analog radio frequency circuit is any one of the plurality of analog radio frequency circuits, and the second analog radio frequency circuit is any one of the plurality of the analog radio frequency circuits except the first analog radio frequency circuit.

Main functions of MAC units (the first MAC unit and the second MAC unit) are data frame encapsulation, addressing and forwarding, receiving and sending scheduling (scheduling the first radio frequency and the second radio frequency to receive and send a signal), radio link status management, and the like.

The first MAC unit and the second MAC unit are separately connected to the coordinated scheduling unit.

Main functions of the joint digital baseband processing circuit are channel measurement, encoding and decoding of a signal, and the like. The joint digital baseband processing circuit may meet processing requirements of a plurality of wireless communications standards by using software definition, and receiving or sending status of a radio frequency and a digital signal of the first radio frequency and the second radio frequency may be jointly controlled.

The joint digital baseband processing circuit may be specifically configured to create digital baseband processing entities corresponding to a plurality of radio frequencies according to standards of the plurality of radio frequencies, and process the first signal and/or the second signal by using the digital baseband processing entities.

Main functions of an analog radio frequency circuit (the first analog radio frequency circuit and the second analog radio frequency circuit) are to be responsible for modulating a sending signal to a specified frequency band and channel according to a radio frequency management requirement, perform analog-to-digital conversion (ADC) or digital-to-analog conversion (DAC) on receiving and sending signals, perform sampling on a received signal, and the like. The analog radio frequency circuit may be an analog circuit, an analog integrated circuit chip, or the like. The first analog radio frequency circuit and the second analog radio frequency circuit are a plurality of components located between the joint digital baseband processing circuit and an antenna, and may include components such as a power amplifier and a filter. The first analog radio frequency circuit and the second analog radio frequency circuit each meet a requirement of a different standard, and the first analog radio frequency circuit and the second analog radio frequency circuit can replace each other.

In this embodiment, operations performed by units of the wireless device are similar to those described in the embodiments shown in FIG. 4 to FIG. 8. Details are not described herein again.

In this embodiment, the joint digital baseband processing circuit that can be customized by software and the analog radio frequency circuit that can be flexibly combined and configured meet a requirement that one set of hardware supports flexible combination and deployment of a plurality of radio frequency standards. The terminal device and the plurality analog radio frequency circuits are scheduled by using a wireless device, to attempt to prevent the coexistence of the first signal and the second signal, so that an occurrence probability of near end interference is reduced. An interference cancellation model is obtained through inter-radio frequency cross training. The interference cancellation model is used to eliminate interference impact of inter-radio frequency.

Figure 12:
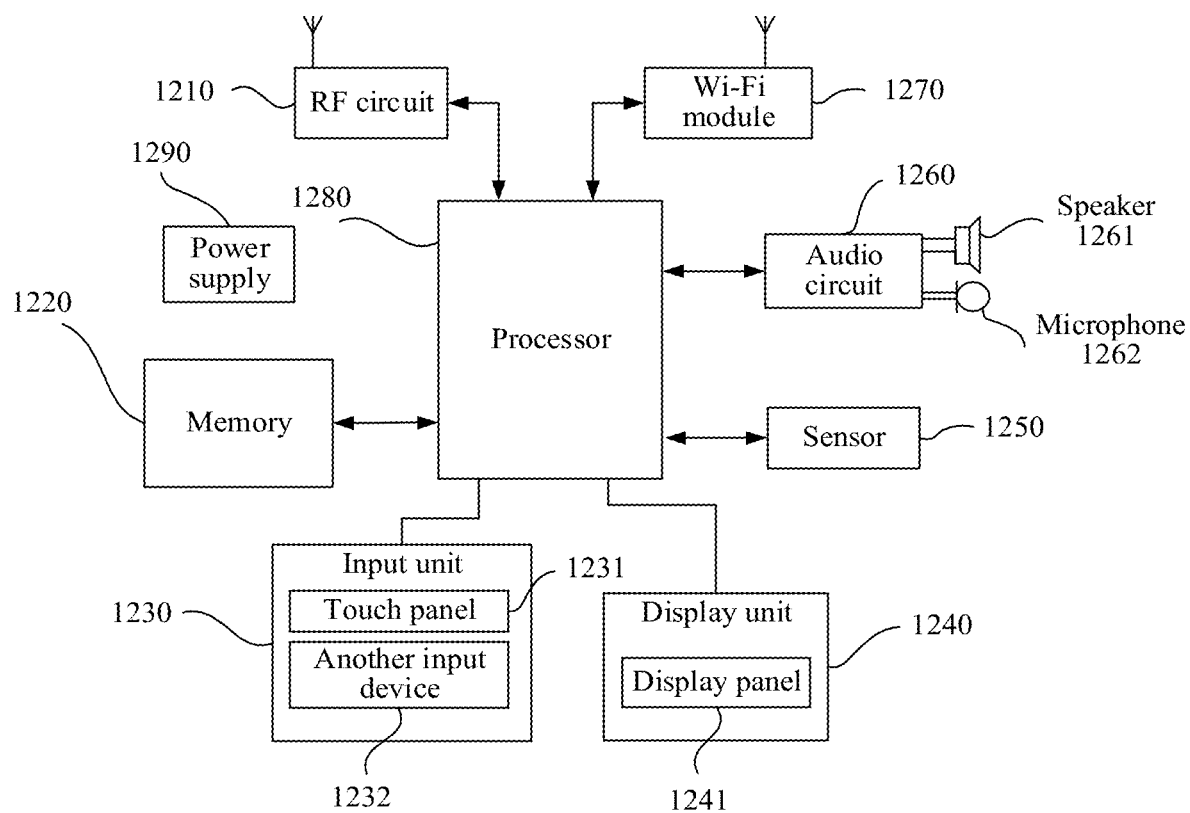
FIG. 12 is a schematic structural diagram of a terminal device according to an embodiment of this application.

As shown in FIG. 12, the embodiments of this application further provides a terminal device. For ease of description, only a part related to the embodiments of this application is shown. For specific technical details that are not disclosed, refer to the method part in the embodiments of this application. The terminal may be any terminal device including a mobile phone, a tablet computer, a PDA, a point of sales (POS), a vehicle-mounted computer, or the like. For example, the terminal is a mobile phone.

FIG. 12 is a block diagram of a partial structure of a mobile phone related to the terminal according to the embodiments of this application. Referring to FIG. 12, the mobile phone includes components such as a radio frequency circuit 1210, a memory 1220, an input unit 1230, a display unit 1240, a sensor 1250, an audio circuit 1260, a WI-FI module 1270, a processor 1280, and a power supply 1290. A person skilled in the art may understand that, a structure of the mobile phone shown in FIG. 12 does not constitute a limitation on the mobile phone. A quantity of components included may be greater or less than that shown in the figure, or some components are combined, or component arrangements are different.

The following describes each component of the mobile phone in detail with reference to FIG. 12.

The radio frequency circuit 1210 may be configured to receive and send signals in an information receiving and sending process or a call process. Particularly, after receiving downlink information of a base station, the radio frequency circuit 1210 delivers the downlink information to the processor 1280 for processing. In addition, the radio frequency circuit 1210 sends related uplink data to the base station. The radio frequency circuit 1210 usually includes but is not limited to an antenna, at least one amplifier, a transceiver, a coupler, a low noise amplifier (LNA), a duplexer, and the like. In addition, the radio frequency circuit 1210 may further communicate with a network and another device through wireless communication. The foregoing wireless communication may use any communications standard or protocol, including but not limited to a Global System for Mobile Communications (GSM), a General Packet Radio Service (GPRS), code-division multiple access (CDMA), wideband CDMA (WCDMA), Long-Term Evolution (LTE), an email, a short message service (SMS), and the like.

The memory 1220 may be configured to store a software program and a module. The processor 1280 runs the software program and the module that are stored in the memory 1220, to implement various function applications and data processing of the mobile phone. The memory 1220 may mainly include a program storage area and a data storage area. The program storage area may store an operating system, an application required by at least one function (such as a sound playback function and an image play function), and the like. The data storage area may store data (such as audio data and a phone book) created based on use of the mobile phone, and the like. In addition, the memory 1220 may include a high-speed random access memory, and may further include a non-volatile memory, such as at least one magnetic disk storage device, a flash memory device, or another volatile solid-state storage device.

The input unit 1230 may be configured to receive input digit or character information and generate key signal input related to user settings and function control of the mobile phone. Specifically, the input unit 1230 may include a touch panel 1231 and another input device 1232. The touch panel 1231, also referred to as a touchscreen, may collect a touch operation (for example, an operation performed by a user on or near the touch panel 1231 by using any proper object or accessory such as a finger or a stylus) performed by the user on or near the touch panel 1231, and drive a corresponding connection apparatus based on a preset program. Optionally, the touch panel 1231 may include a touch detection apparatus and a touch controller. The touch detection apparatus detects a touch direction of the user, detects a signal brought by a touch operation, and transfers the signal to the touch controller. The touch controller receives touch information from the touch detection apparatus, converts the touch information into coordinates of a touch point, then sends the coordinates of the touch point to the processor 1280, and can receive and execute a command sent by the processor 1280. In addition, the touch panel 1231 may be implemented in a plurality of types, such as a resistive type, a capacitive type, an infrared type, and a surface acoustic wave type. In addition to the touch panel 1231, the input unit 1230 may further include the another input device 1232. Specifically, the another input device 1232 may include but is not limited to one or more of a physical keyboard, a function button (for example, a volume control button or a power on/off button), a trackball, a mouse, a joystick, and the like.

The display unit 1240 may be configured to display information entered by the user or information provided for the user, and various menus of the mobile phone. The display unit 1240 may include a display panel 1241. Optionally, a liquid-crystal display (LCD), an organic light-emitting diode (OLED), or the like may be used to configure the display panel 1241. Further, the touch panel 1231 may cover the display panel 1241. After detecting the touch operation on or near the touch panel 1231, the touch panel 1231 transfers the touch operation to the processor 1280 to determine a type of a touch event. Subsequently, the processor 1280 provides a corresponding visual output on the display panel 1241 based on the type of the touch event. In FIG. 12, the touch panel 1231 and the display panel 1241 serve as two independent components to implement input and output functions of the mobile phone. However, in some embodiments, the touch panel 1231 and the display panel 1241 may be integrated to implement the input and output functions of the mobile phone.

The mobile phone may further include at least one sensor 1250, such as an optic sensor, a movement sensor, and another sensor. Specifically, the optic sensor may include an ambient optical sensor and a proximity sensor. The ambient optical sensor may adjust luminance of the display panel 1241 based on brightness of ambient light. The proximity sensor may turn off the display panel 1241 and/or backlight when the mobile phone approaches an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone. Details are not described herein.

The audio circuit 1260, a speaker 1261, and a microphone 1262 may provide an audio interface between the user and the mobile phone. The audio circuit 1260 may convert received audio data into an electrical signal and transmit the electrical signal to the speaker 1261. The speaker 1261 converts the electrical signal into a sound signal for output. In addition, the microphone 1262 converts a collected sound signal into an electrical signal. The audio circuit 1260 receives the electrical signal, converts the electrical signal into audio data, and then outputs the audio data to the processor 1280. The processor 1280 processes the audio data and then sends the processed audio data to, for example, another mobile phone through the radio frequency circuit 1210, or outputs the processed audio data to the memory 1220 for further processing.

WI-FI is a short-distance wireless transmission technology. The mobile phone can help the user receive and send an email, browse a web page, access streaming media, and the like by using the WI-FI module 1270. The WI-FI module 1270 provides wireless broadband internet access for the user. Although FIG. 12 shows the WI-FI module 1270, it may be understood that the WI-FI module 1270 is not a mandatory component of the mobile phone.

The processor 1280 is a control center of the mobile phone, is connected to all parts of the entire mobile phone by using various interfaces and lines, and by running or executing a software program and/or a module that are/is stored in the memory 1220 and by invoking data stored in the memory 1220, executes various functions of the mobile phone and process data, to perform overall monitoring on the mobile phone. Optionally, the processor 1280 may include one or more processing units. Preferably, the processor 1280 may integrate an application processor and a modem processor. The application processor mainly processes an operating system, a user interface, an application program, and the like. The modem processor mainly processes wireless communication. It may be understood that, the modem processor may alternatively not be integrated into the processor 1280.

The mobile phone further includes the power supply 1290 (for example, a battery) that supplies power to all components. Preferably, the power supply may be logically connected to the processor 1280 by using a power management system, so that functions such as charging and discharging management and power consumption management are implemented by using the power management system.

Although not shown, the mobile phone may further include a camera, a Bluetooth module, and the like. Details are not described herein again.

In the embodiments of this application, the processor 1280 included in the terminal may perform functions in the embodiments shown in FIG. 4 to FIG. 8. Details are not described herein again.

This application further provides a wireless device. The wireless device includes a processor and a memory. The processor is coupled to the memory. The memory is configured to store instructions for performing the method in the first aspect and the implementations of the first aspect, and store data used to implement the method in the first aspect and the implementations of the first aspect. The processor is configured to execute the instructions stored in the memory, so that the wireless device implements the method in any one of the implementations in FIG. 4 to FIG. 8. In a possible design, the wireless device is a chip or a system on chip.

The embodiments of this application further includes a chip. The chip is configured to schedule a terminal device and a plurality of analog radio frequency circuits, to attempt to prevent coexistence of a first signal and a second signal. The first signal is a signal sent by a first analog radio frequency circuit, and the second signal is a signal sent by the terminal device to a second analog radio frequency circuit. The first analog radio frequency circuit is any one of the plurality of analog radio frequency circuits, and the second analog radio frequency circuit is any one of the plurality of the analog radio frequency circuits except the first analog radio frequency circuit. In a possible design, the chip includes a digital baseband processing circuit and/or the plurality of analog radio frequency circuits. The digital baseband processing circuit is configured to generate the first signal. Certainly, the chip includes the digital baseband processing circuit and/or the analog radio frequency circuit, to be specific, the digital baseband processing circuit and the analog radio frequency circuit may be integrated, or may be physically separated.

The digital baseband processing circuit in the embodiments of this application may be a digital signal processor (DSP), a field-programmable gate array (FPGA), an ASIC, or the like. This is not specifically limited herein.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is one example of this description. For example, the unit division is logical function division, and there may be another division manner in actual implementation, for example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and is sold or used as an independent product, the integrated unit may be stored in a computer-readable storage medium. Based on such an understanding, the technical solutions of this application essentially, or the part contributing to other approaches, or all or some of the technical solutions may be implemented in the form of a program product. The program product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

What is claimed is:

1. A multi-radio frequency anti-interference method implemented by a wireless device comprising a plurality of analog radio frequency circuits, the multi-radio frequency anti-interference method comprising:
   scheduling, by a wireless device, a terminal device and the plurality of analog radio frequency circuits to prevent coexistence of a first signal and a second signal, wherein the plurality of analog radio frequency circuits comprise a first analog radio frequency circuit and a second analog radio frequency circuit, wherein the first analog radio frequency circuit is different from the second analog radio frequency circuit, wherein the first signal is from the wireless device, and wherein the second signal is from the terminal device to the wireless device;
   scheduling, by the wireless device, the first analog radio frequency circuit to send the first signal to the terminal device in a first time period; and
   scheduling, by the wireless device, the terminal device not to send the second signal to the wireless device in the first time period.

2. The multi-radio frequency anti-interference method of claim 1, further comprising:
   scheduling, by the wireless device, the second analog radio frequency circuit not to send the first signal to the terminal device in a second time period; and
   scheduling, by the wireless device, the terminal device to send the second signal to the wireless device in the second time period.

3. The multi-radio frequency anti-interference method of claim 1, further comprising:
   meeting, by the first analog radio frequency circuit, a first standard; and
   meeting, by the second analog radio frequency circuit, second standard.

4. The multi-radio frequency anti-interference method of claim 1, further comprising:
   sending, by the first analog radio frequency circuit, a first target signal in a third time period;
   transforming, by the wireless device, the first target signal into a cancellation signal of the first target signal based on an interference cancellation model, wherein the interference cancellation model is associated with first interference from the first analog radio frequency circuit with the second analog radio frequency circuit;
   receiving, by the second analog radio frequency circuit, a second target signal in the third time period; and
   canceling, by the wireless device, a first interference signal in the second target signal based on the cancellation signal, wherein the first interference signal is from the first analog radio frequency circuit in the third time period, and wherein the first interference signal causes a second interference with the second analog radio frequency circuit.

5. The multi-radio frequency anti-interference method of claim 4, further comprising:
   sending, by the first analog radio frequency circuit, a training signal in a training time period;
   receiving, by the second analog radio frequency circuit, a second interference signal in the training time period, wherein the second interference signal is from the first analog radio frequency circuit in the training time period, wherein the second interference signal causes a third interference with the second analog radio frequency circuit; and
   obtaining the interference cancellation model by training the training signal and the second interference signal.

6. The multi-radio frequency anti-interference method of claim 1, wherein operating bands of each of the analog radio frequency circuits are in a same frequency range or in an adjacent frequency range.

7. The multi-radio frequency anti-interference method of claim 1, further comprising:
   creating, by the wireless device, according to standards of a plurality of radio frequencies, digital baseband processing entities corresponding to the radio frequencies; and
   processing, by the wireless device, the first signal or the second signal using the digital baseband processing entities.

8. A wireless device, comprising:
   a plurality of analog radio frequency circuits;
   a processor; and
   a memory coupled to the processor and configured to store instructions that, when executed by the processor, cause the wireless device to be configured to:
      schedule a terminal device and the plurality of analog radio frequency circuits to prevent coexistence of a first signal and a second signal, wherein the plurality of analog radio frequency circuits comprise a first analog radio frequency circuit and a second analog radio frequency circuit, wherein the first analog radio frequency circuit is different from the second analog radio frequency circuit, wherein the first signal is a signal from the wireless device, and wherein the second signal is from the terminal device to the wireless device;
      schedule the first analog radio frequency circuit to send the first signal to the terminal device in a first time period; and
      schedule the terminal device not to send the second signal to the wireless device in the first time period.

9. The wireless device of claim 8, wherein the wireless device is a chip or a system on chip.

10. The wireless device of claim 8, wherein the instructions, when executed by the processor, further cause the wireless device to be configured to:
   schedule the second analog radio frequency circuit not to send the first signal to the terminal device in a second time period; and
   schedule the terminal device to send the second signal to the wireless device in the second time period.

11. The wireless device of claim 8, wherein the first analog radio frequency circuit and the second analog radio frequency circuit each meet a requirement of a different standard, and wherein the first analog radio frequency circuit and the second analog radio frequency circuit are configured to replace each other.

12. The wireless device of claim 8, wherein the first analog radio frequency circuit is configured to send a first target signal in a third time period.

13. The wireless device of claim 12, wherein the instructions, when executed by the processor, further cause the wireless device to be configured to transform the first target signal into a cancellation signal of the first target signal based on an interference cancellation model, wherein the interference cancellation model is associated with first interference from the first analog radio frequency circuit with the second analog radio frequency circuit.

14. A chip comprising a plurality of analog radio frequency circuits; wherein the chip is configured to:
  schedule a terminal device and the analog radio frequency circuits to prevent coexistence of a first signal and a second signal, wherein the plurality of analog radio frequency circuits comprise a first analog radio frequency circuit and a second analog radio frequency circuit, wherein the first analog radio frequency circuit is different from the second analog radio frequency circuit, wherein the first signal is a signal from a wireless device, and wherein the second signal is from the terminal device to the wireless device;
  schedule the first analog radio frequency circuit to send the first signal to the terminal device in a first time period; and
  schedule the terminal device not to send the second signal to the wireless device in the first time period.

15. The chip of claim 14, further comprising a digital baseband processing circuit configured to generate the first signal.

16. The chip of claim 14, wherein the chip is further configured to:
  schedule the second analog radio frequency circuit not to send the first signal to the terminal device in a second time period; and
  schedule the terminal device to send the second signal to the wireless device in the second time period.

17. The chip of claim 14, wherein the first analog radio frequency circuit and the second analog radio frequency circuit each meet a requirement of a different standard, and wherein the first analog radio frequency circuit and the second analog radio frequency circuit are configured to replace each other.

18. The chip of claim 14, wherein:
  the first analog radio frequency circuit is configured to send a first target signal in a third time period; and
  the chip is configured to transform the first target signal into a cancellation signal of the first target signal based on an interference cancellation model, wherein the interference cancellation model is associated with first interference from the first analog radio frequency circuit with the second analog radio frequency circuit;
  the second analog radio frequency circuit is configured to receive a second target signal in the third time period; and
  the chip is configured to cancel a first interference signal in the second target signal based on the cancellation signal, wherein the first interference signal is from the first analog radio frequency circuit in the third time period, wherein the first interference signal causes a second interference with the second analog radio frequency circuit.

19. The chip of claim 18, wherein:
  the first analog radio frequency circuit is configured to send a training signal in a training time period;
  the second analog radio frequency circuit is configured to receive a second interference signal in the training time period, wherein the second interference signal is from the first analog radio frequency circuit in the training time period, wherein the second interference signal causes a third interference with the second analog radio frequency circuit; and
  the chip is configured to obtain the interference cancellation model by training the training signal and the second interference signal.

20. The chip of claim 14, wherein operating bands of each of the analog radio frequency circuits are in a same frequency range or in an adjacent frequency range.

* * * * *